United States Patent
Teodor et al.

(10) Patent No.: US 12,211,039 B2
(45) Date of Patent: *Jan. 28, 2025

(54) EXTERNALLY VALIDATED PROOF OF WORK FOR APPENDING A BLOCK RECORD TO A BLOCKCHAIN WITH A DATA BROKER SERVER

(71) Applicant: VEIOVIA LIMITED, York (GB)

(72) Inventors: Roxana Iuliana Teodor, York (GB); Peter Damian Ashton, York (GB); Remy Lyon, York (GB); Siamak Fayyaz Shahandashti, York (GB)

(73) Assignee: Veiovia Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,355

(22) Filed: Sep. 20, 2022

(65) Prior Publication Data

US 2024/0095730 A1 Mar. 21, 2024

(51) Int. Cl.
G06F 21/00 (2013.01)
G06Q 20/02 (2012.01)
G06Q 20/38 (2012.01)

(52) U.S. Cl.
CPC .......... *G06Q 20/389* (2013.01); *G06Q 20/02* (2013.01)

(58) Field of Classification Search
CPC ...... H04L 9/50; H04L 9/3297; G06F 16/2379
See application file for complete search history.

(56) References Cited

U.S. PATENT DOCUMENTS

| | | | |
|---|---|---|---|
| 6,865,573 B1 * | 3/2005 | Hornick | G06F 16/252 707/999.01 |
| 7,328,192 B1 * | 2/2008 | Stengard | G06F 16/21 707/999.001 |
| 9,141,823 B2 * | 9/2015 | Dawson | H04L 9/00 |
| 10,939,405 B1 * | 3/2021 | Haleem | H04L 9/3239 |
| 2015/0170112 A1 * | 6/2015 | DeCastro | G06Q 20/381 705/39 |
| 2019/0189246 A1 * | 6/2019 | Colavin | H04L 9/0643 |
| 2020/0076573 A1 * | 3/2020 | Deshpande | G06F 16/2465 |
| 2020/0389292 A1 * | 12/2020 | Bartolucci | H04L 9/3066 |
| 2021/0258169 A1 * | 8/2021 | Basu | H04L 9/0637 |

(Continued)

OTHER PUBLICATIONS

Notice of allowance and fees due in U.S. Appl. No. 17/948,347, filed Sep. 20, 2022, 27 pages.

*Primary Examiner* — Mahfuzur Rahman
(74) *Attorney, Agent, or Firm* — Baker Botts L.L.P.

(57) ABSTRACT

A method for establishing an externally verifiable proof of work comprises receiving signal information to be kept private; storing the signal information as one or more data packages in a data package store; and receiving a request for a first data package from a first mining node and a request for a second data package from a second mining node. The method further comprises randomly selecting a data package awaiting processing from the data package store and sending the selected data package to the first mining node and to the second first mining node. The method further comprises receiving a first private data output from the first mining node and receiving a second private data output from the second mining node. The method further comprises accessing a commitment database and cross checking that a database entry for a first data package identifier and a second data package identifier are validated.

18 Claims, 8 Drawing Sheets

Specification includes a Sequence Listing.

(56) References Cited

U.S. PATENT DOCUMENTS

| | | | | |
|---|---|---|---|---|
| 2021/0314397 A1* | 10/2021 | Basu | .................... | H04L 9/0643 |
| 2021/0390549 A1* | 12/2021 | Rule | .................... | G06Q 20/403 |
| 2022/0398250 A1* | 12/2022 | Sui | .................... | G06F 11/1451 |
| 2024/0070627 A1* | 2/2024 | Galterio | ............. | G06Q 20/4014 |

* cited by examiner

EXTERNALLY VALIDATED PROOF OF WORK FOR APPENDING A BLOCK RECORD TO A BLOCKCHAIN WITH A DATA BROKER SERVER

SEQUENCE LISTING

This application contains a Sequence Listing, which has been submitted in XML format via EFS-Web, and is hereby incorporated by reference in its entirety. Said XML copy, created on Apr. 6, 2023, is named P334787US2.xml and is 3,050 bytes in size.

TECHNICAL FIELD

The present disclosure relates to mining nodes, and computer program products and methods of operation thereof for establishing an externally verifiable proof of work for use in appending a block record to a blockchain.

BACKGROUND

A blockchain, sometimes known as a distributed ledger or a distributed consensus ledger, is a type of distributed database. A blockchain enables tamper-resistant and decentralized storage of data. A copy of the ledger/blockchain can be stored on each of multiple nodes of a blockchain network.

A blockchain comprises a plurality of block records, also known as blocks or data structure blocks. A block record of a blockchain typically comprises payload data (i.e. the data recorded in that block record for storage in the blockchain), a unique identifier of a preceding block record of the blockchain, and a proof-of-work (POW). When a block record is added to the blockchain, copies of the new block/blockchain are distributed to other nodes of the blockchain network, which can verify the work done to append the new block and accept the update to the blockchain or can disregard the new block if the associated work cannot be verified.

A block record typically comprises payload data in the form of data and/or computer-executable instructions. In this way, if the blockchain is used, for example, to record instructions such as transactions, then a complete history of transactions can be established on the ledger. Each transaction is a data structure that encodes the transfer of control of a digital asset from one party of a blockchain system to another. If the blockchain is used, for example, to record computer-executable instructions (often referred to as a "smart contract"—a computerized protocol that executes the terms of a machine-readable contract or agreement) then function calls to the computer-executable instructions can be used to initiate a computer-executable process. A smart contract can process inputs in order to produce results, which can then cause actions to be performed based on those results.

Each block record typically contains a link to a preceding block record, for example, a hash value of the information in the preceding block record or a hash value of a header of the previous block record. The hash value is typically determined by using the information of the preceding block as part of the input to a hash function which outputs the hash value. Each block record links back to the preceding block record. In this way, once validated, a block record will be linked to a preceding block record and, through that preceding block record, to each earlier block record in turn back to a genesis block record—the only block record which does not contain a link to a preceding block record. Although the hash value is typically simple to compute, there may be one or more validity requirements imposed on the hash value. In addition, the hash value is normally based on a special type of mathematical function that is not reversible and so one cannot readily know which input will give a desired output without trialing numerous inputs.

Each block record typically also comprises a proof-of-work (POW). A POW is a piece of data which is difficult to produce but easy for others (that is, other users or other computing devices) to verify and which satisfies certain validity requirements. Each block record thereby provides trustable, reliable evidence that work has been done generating it. That work may be, for example an expenditure of a significant amount of processing resources such as the time taken to compute some output.

The integrity of payload data stored in the blockchain is ensured because each block record links to a preceding block record and because in order to tamper with payload data in a block record of the blockchain, a tampering party would have to do further work to store the tampered block and each subsequent block on the blockchain, which is infeasible while the majority of nodes of the blockchain network are each checking the validity of the blockchain and adding their own block records.

Within some blockchain implementations, such as the popular "Bitcoin", each block includes a header having a hash value for the previous block. To create a new block, a miner must find a nonce value which, when included as part of the input to the hash function, results in a hash value which meets a certain validity requirement, in particular a hash value that is below a predetermined threshold value. A miner typically guesses a nonce value and then checks that, when the guessed nonce value is combined with other fixed data including the hash of the preceding block and input into the hash function, the hash function outputs a hash value that is below the predetermined threshold value. In this way, the miner does work in expending computational resources to find a suitable nonce value satisfying a validity requirement. Once found, a second miner can check that a particular block is valid by inputting the same information including the declared nonce value into the hash function and checking that the output is valid. In such blockchain implementations, the declared nonce thus serves as a proof-of-work for the relevant block.

Recently, such as in International Patent Application Publication No. WO2020/120933A1, an alternative blockchain implementation has been proposed in which the proof of work is provided by mining nodes performing "useful" computational work, rather than solving mathematical puzzles with no practical use or value beyond the creation of the proof of work. In WO2020/120933A1, an authority server provides data packages for processing to mining nodes in a mining network. The data packages each comprise a plurality of datasets. Each of the datasets comprises signal information. On receiving a data package, a mining node can analyze the data package to convert the signal information of each dataset to a corresponding data output by performing computational work. The mining node then communicates the plurality of data outputs to an authority server, the plurality of data outputs for use in establishing a proof-of-work for appending a block record to the blockchain. In particular, on receipt of the data outputs from the mining node, the authority server may generate a signed cryptographically generated datum (such as a "cryptotoken") which is provided to the mining node. The signed cryptotoken can then be used by the mining node as a proof of work, by which the mining node can create a block record that can be successfully appended to the blockchain and communicated throughout the mining network for duplication. The signed token may be intrinsically linked to the specific work performed by the mining node by, for example, containing a signed hash of the analyzed data package. The authority server may send the same data package to plural different mining nodes for independent processing, with the data outputs produced by each being differently encoded using a different substitution cipher where the key is determined by the content of the data package, and the ID of the miner. As a result, the mining nodes will generate different ciphers, stopping them colluding directly to submit fake results.

BRIEF SUMMARY OF THE DISCLOSURE

The proof of work for appending a block record to a blockchain should ideally be testable by any observer to verify that the work has actually been performed and that the requirements for appending a block record to the blockchain have been satisfied. For example, in a 'bitcoin' implementation, the declared nonce value providing the proof of work can be tested by any mining node by using the hash function to determine whether or not it does produce an output value below the requisite level. Thus the proof of work is prima facie and independently verifiable evidence that the work needed has been successfully completed.

However, in the blockchain implementation described in WO2020/120933A1, in particular where the data outputs provided by the mining nodes are sensitive and should be kept private (at least at the time of the creation of the block record), such as genetic sequencing data, the proof of work does not itself provide prima facie and independently verifiable evidence that the participating mining nodes have successfully completed the computational work in such a way that the data outputs corroborate against each other. Instead, in this implementation, the mining nodes have to trust the authority server's validation of the data outputs from the mining nodes in the creation of the proof of work. That is, without being able to themselves verify that the data outputs of the mining nodes corroborate, the mining nodes have no choice but to trust the authority server's validation in the generation of the proof of work. In this sense, in absence of any external validation of the proof of work, the blockchain implementation more closely resembles a proof-of-authority system in which the consensus mechanism relies on one or more trusted nodes in the blockchain network (i.e. the authority servers). However, this may be seen to undermine the premise of a blockchain system in which the successful completion of the computational work performed by the mining nodes needs to itself directly and indisputably lead to the valid addition of a block record to the block chain, without having to trust any particular node of the blockchain network to provide the validation necessary for adding a block record to the block chain.

The systems and methods described herein may be applied in a wide range of practical applications. Among many practical applications, a blockchain facilitates information sharing and asset management throughout decentralization. There may be a reduction in the cost burden associated with decentralization. The systems and methods disclosed herein can improve current blockchain technology protocols by establishing an externally verifiable proof of work completed by the mining node to generate a private data output. This serves as immutable evidence of computational work, wherein the proof of work is used in appending a block record to a blockchain. To provide an externally verifiable proof of work for each block record, mining nodes may be configured to post metadata commitment values and validation data to a commitment database. The entries in the commitment database may, by cross-validation, be usable to check that other mining nodes have processed the same data package and obtain the same private data output. This evidence allows the mining nodes to demonstrate that they have successfully completed the analysis work on the data package, without colluding with other mining nodes, and without needing to reveal the private data output or having to trust a data broker server to validate the work.

Thus, viewed from one aspect, the present disclosure provides a method, performed in a mining node in a mining network, for establishing an externally verifiable proof of work as immutable evidence of computational work completed by the mining node to generate a private data output, the proof of work being for use in appending a block record to a blockchain, the method comprising: receiving from a data broker server a data package comprising signal information to be kept private by the mining node; analyzing, by computational work, the data package to convert the signal information to a corresponding private data output also to be kept private by the mining node; as a result of the analyzing, generating metadata characteristic of the analysis of the corresponding signal information, the metadata being independent of the private data output generated by the analysis; using a cryptographic commitment scheme to generate, from a combination of the metadata and validation data, a metadata commitment value for the data package as analyzed by the mining node; communicating the metadata commitment value and the validation data to a commitment database server permitting external access to the metadata commitment value for use in providing an externally verifiable proof of work.

Viewed from another aspect, the present disclosure provides a mining node for establishing an externally verifiable proof of work as immutable evidence of computational work completed by the mining node to generate a private data output, the proof of work being for use in appending a block record to a blockchain, the mining node comprising: a processor; and a memory storing instructions that, when executed by the processor, configure the mining node to: receive from a data broker server a data package comprising signal information to be kept private by the mining node; analyze, by computational work, the data package to convert the signal information to a corresponding private data output also to be kept private by the mining node; as a result of the analyzing, generate metadata characteristic of the analysis of the corresponding signal information, the metadata being independent of the private data output generated by the analysis; use a cryptographic commitment scheme to generate, from a combination of the metadata and validation data, a metadata commitment value for the data package as analyzed by the mining node; communicate the metadata commitment value and the validation data to a commitment database server permitting external access to the metadata commitment value for use in providing an externally verifiable proof of work.

Viewed from another aspect, the present disclosure provides a computer program product, optionally embodied in a non-transitory computer-readable storage medium, the computer program product including instructions that when executed by a computer, cause the computer to: receive from a data broker server a data package comprising signal information to be kept private by the mining node; analyze, by computational work, the data package to convert the signal information to a corresponding private data output also to be kept private by the mining node; as a result of the analyzing, generate metadata characteristic of the analysis of the corresponding signal information, the metadata being independent of the private data output generated by the analysis; use a cryptographic commitment scheme to generate, from a combination of the metadata and validation data, a metadata commitment value for the data package as analyzed by the mining node; communicate the metadata commitment value and the validation data to a commitment database server permitting external access to the metadata commitment value for use in providing an externally verifiable proof of work.

In embodiments, the method may further comprise: validating, using a second metadata commitment value received from the commitment database server, the second metadata commitment value being generated by a second mining node by analyzing the same data package, that a second mining node has produced matching metadata as a result of the analysis performed by the second mining node; and based on the validating, communicating the metadata for the data package to the commitment database server permitting external access to the metadata for durable storage therein.

In embodiments, the validating may further comprise: receiving, from the commitment database server, after a second mining node has completed analyzing the same data package, second metadata commitment value and second validation data for the data package generated by the second mining node and communicated to the commitment database server; using a cryptographic commitment scheme to generate, from a combination of the metadata for the data package generated by the mining node and the received second validation data, a recreated second metadata commitment value for the data package; comparing the recreated second metadata commitment value and the received second metadata commitment value generated by the second mining node; and if the comparing indicates the recreated second metadata commitment value and the received second metadata commitment value match, validating that the second mining node has successfully performed the same analysis of the data package to generate the same metadata and the same private data output.

In embodiments, the method may further comprise: only communicating the metadata for the data package to the commitment database server if the second metadata commitment value validates.

In this way, by reference to other metadata commitment values in the externally accessible commitment database, mining nodes can check and validate whether other mining nodes in the mining network have analyzed the same data package and produced by their analysis the same metadata. This is achieved by the mining node accessing the metadata commitment values posted by other mining nodes to the commitment database, and attempting to recreate, using the cryptographic commitment scheme, that metadata commitment value using the metadata generated by the mining node in its own analysis, and the validation data posted to the commitment database together with the metadata commitment value. If the recreated metadata commitment value is the same as the metadata commitment value posted to the commitment server by the other mining node, the mining node will be able to demonstrate that it has successfully completed the analysis and that this corroborates against another mining node, with which it cannot have colluded. Provided the minimum validation requirements are met, the mining node can then request the issuance of a cryptotoken, for example from the data broker server, with the metadata commitment value entry posted in the commitment database acting as an externally verifiable proof of work without that private data output needing to be revealed. In particular, if, after the mining node has validated a second metadata commitment value from a second mining node, the mining node posts to the commitment database the metadata it generated, then any node having access to the commitment database can validate the work completed by the mining node using the cryptographic commitment scheme based on the combination of the posted metadata and validation data, and by comparing the recreated metadata commitment value with the posted metadata commitment value. In this way, the commitment database entry by the mining node acts as an externally verifiable proof of work for the analysis of the data package performed at the mining node, without the private data output needing to be revealed. Thus the commitment database can support a proof of work for such a blockchain implementation, without having to rely solely on the authority of the data broker server. Further, by the commitment database, mining nodes can be caused to perform computational work to produce private data outputs, in a way in which collusion between the mining nodes is prevented, while also allowing non-colluding mining nodes to cross check their analysis and post an externally verifiable proof of work.

In embodiments, at least one further of mining node may been sent the data package for analysis, and the method may further comprise: validating, using one or more further metadata commitment values received from the commitment database server, the or each further metadata commitment value having been generated by a respective at least one further mining node, that all of the at least one further mining nodes have produced matching metadata as a result of their analysis; and based on the validating, only communicating the metadata for the data package to the commitment database server if a minimum number of the received metadata commitment values validate. In this way, the same data package can be analyzed by two or more, or at least three, mining nodes, with the results of the analysis by each mining node being externally verifiable.

In embodiments, the external access from the commitment database server to the or each metadata commitment value and the or each respective validation data for each metadata commitment value, and the subsequently revealed metadata, may allow a proof of work by verification that each metadata commitment value produced by each mining node was produced using the cryptographic commitment scheme from a combination of their respective validation data and the matching metadata produced by the analysis performed at each mining node.

In embodiments, the proof of work may be validated without reference to the private data output.

In embodiments, the method may further comprise communicating the private data output for the data package to the data broker server.

In embodiments, the method may further comprise: creating a block record for the blockchain using a reference to at least the metadata commitment value stored at the commitment database server as the proof of work; and communicating the created block record to at least another mining node of the mining network. In this way, the metadata commitment value may serve as a proof of work.

In embodiments, creating a block record for the blockchain may include: consulting a version of the blockchain stored in one or more machine readable storage media to extract the unique identifier of the preceding block of the blockchain; and retrieving payload data from a data pool of unprocessed payload data.

In embodiments, the validation data may comprise one or more of: a mining node identifier for the mining node performing the analysis of the data package; a data package identifier for the data package, as assigned by the data broker server; a cryptographic nonce. In this way, the metadata commitment value for the identical metadata output for the same data package may be different for each mining node. The data package identifier assigned by the data broker server for the same data package may be different for each mining node assigned with analyzing the data package. This can prevent collusion between mining nodes as they cannot identify other mining nodes processing the same data package. The mining nodes may watch the commitment database and attempt to validate metadata commitment values posted thereto by cross-checking against the metadata produced by the mining node in as-yet unvalidated data packages to attempt to find identical metadata produced by other mining nodes that may have analyzed the same data package and produced the same metadata.

In embodiments, using the cryptographic commitment scheme may comprise generating a hash of a combination of the metadata generated by the mining node and the validation data using a cryptographic hash function. A suitable cryptographic hash function has the properties needed to provide a suitable cryptographic commitment scheme.

In embodiments, the data package may comprise at least one data entity, wherein each data entity comprises signal information, the signal information of the or each data entity being analyzed to convert it to a corresponding private data output, the metadata commitment value being a hash of a combination of the metadata for all data entities in the data package and the validation data.

In embodiments, the signal information may be representative of a polynucleotide or polypeptide sequence; and converting the signal information to a corresponding private data output may comprise converting the signal information to a corresponding read, each read of the plurality of reads describing the respective polynucleotide or polypeptide sequence.

In embodiments, the polynucleotide sequence may comprise a deoxyribonucleic acid, DNA, sequence or a ribonucleic acid, RNA, sequence. In embodiments, the signal information may comprise raw data produced by a nanopore sequencer. In embodiments, the signal information may comprise current information corresponding to current flow through a nanopore and a polynucleotide or polypeptide translocating through the nanopore. In this way, the method may provide a mechanism for mining nodes to analyze signal information output from a genetic sequencer to generate reads of a polynucleotide or polypeptide sequence, and for the computational work necessary to generate the polynucleotide or polypeptide sequence to be externally verifiable such that a proof of work can be generated and used for appending a block record to a block chain.

In embodiments, the data package received from the data broker server allocated to the mining node for analysis may be randomly selected from a plurality of data packages stored at the data broker server for analysis.

In embodiments, the data package received from the data broker server may specify one or more computer program products or algorithms to be used by the mining node in analyzing the data package.

In embodiments, the analyzing of the data package by the or each mining node outputs the same metadata for the same private data output produced by the analysis, the metadata and private data output containing no mutual information. In embodiments, the metadata is deterministically produced as a by-product of the analysis of the data package to convert the signal information to the private data output. In embodiments, the metadata and the metadata commitment value are usable as evidence to indicate a private data output of an analysis of the data package by the mining node.

In embodiments, the analyzing of the data package by the mining node may include using a pre-trained neural network to convert the signal information to the private data output. In embodiments, the metadata is based on a score produced by the neural network, the score being representative of the probability of correctness of the private data output and/or a quality of the input signal information.

In embodiments, the blockchain is permissionless allowing any computing device to operate as a mining node.

In embodiments, the metadata commitment value, validation data and metadata for any data package is accessible in the commitment database server by any mining node. The commitment database in the commitment database server may be publicly accessible. In this way, any computational node capable of processing the signal data may act as a mining node in the mining network.

In embodiments, the method may further comprise: receiving, from another mining node of the blockchain network, a block record for addition to the blockchain; extracting from the received block record a reference to a second metadata commitment value stored at the commitment database server; verifying the proof of work for the second mining node using the second metadata commitment value stored at the commitment database server; and based on the verifying, updating the blockchain to include the received block record. In this way, the proof of work in block records received for appending to the blockchain may be validated at each mining node with reference to the entries in the commitment database, without having to relying on trust in the data broker server to act as an authority server. In embodiments, verifying the proof of work for the second mining node may comprise: receiving, from the commitment database server, the second metadata commitment value, second validation data, and the subsequently revealed second metadata; hashing the received second metadata and the second mining node identifier to generate a recreated second metadata commitment value; comparing the recreated second metadata commitment value and the received second metadata commitment value; and if the comparing indicates the recreated second metadata commitment value and the received second metadata commitment value match, validating the proof of work for the received block record.

Viewed from another aspect, the present disclosure provides a commitment database server, a method and computer program product for implementing the method in a commitment database server, for use in conjunction with a plurality of mining nodes as described herein, the method in the commitment database server comprising: receiving from a first mining node, a first metadata commitment value and first validation data; receiving from a second mining node, a second metadata commitment value and second validation data; the first and second metadata commitment values being generated by the first and second mining nodes using a cryptographic commitment scheme from a combination of respective validation data on and metadata characteristic of analysis, by computational work by the respective mining nodes, of a data package provided by a data broker server, the data package comprising signal information to be kept private by the mining node, the analysis converting the signal information to a corresponding private data output and generating metadata characteristic of the analysis of the corresponding signal information; the method further comprising: storing the first and second metadata commitment values and first and second validation data together with timestamps for the time of their receipt at the commitment database server in a externally accessible, tamper-proof and immutable commitment database; providing the second metadata commitment value and second validation data to the first mining node for verification by the first mining node; and if the first mining node verifies that the second mining node has analyzed the same data package as the first mining node, receiving, from the first mining node the metadata characteristic of the analysis of the data package by the first mining node; storing the metadata together with a timestamp for the time of receipt at the commitment database server in the commitment database.

In this way, the commitment database retaining a tamper-proof and timestamped record of metadata commitment values and validation data allows external verification by mining nodes of the computational work done to generate a private data output, without needing to reveal the private data output, the successfully validated entries including the metadata providing an externally verifiable proof of work for use in appending a block record to a blockchain.

Viewed from another aspect, the present disclosure provides a data broker server, a method and computer program product for implementing the method in a data broker server, for use in conjunction with a commitment database server and a plurality of mining nodes as described herein, the method in the data broker server comprising: receiving signal information to be kept private; storing the signal information as one or more data packages in a data package store; receiving a request for a data package from a first mining node and a request for a data package from a second mining node; randomly selecting a data package awaiting processing from the data package store; sending the selected data package to the first mining node with a first data package identifier and sending the selected data package to the second first mining node with a second data package identifier, different to the first data package identifier; receiving a first private data output from the first mining node having analyzed the data package and receiving a second private data output from the second mining node having analyzed the data package; accessing the commitment database in the commitment database server and cross checking that the database entries for the first data package identifier and the second data package identifier validate. Once the miners have both validated the values in the commitment database, then can each release the metadata string into the database, so that the process can be externally validated.

In this way, a data broker server may provide randomly selected data packages for processing to mining nodes in a mining network, and it may provide signed cryptotokens for adding block records to a blockchain if the metadata commitment value posted to a commitment database cross validates the computational work performed by the mining node, such that the entry in the commitment database provides an externally verifiable proof of work.

It will be appreciated from the foregoing disclosure and the following detailed description of the examples that certain features and implementations described as being optional in relation to any given aspect of the disclosure set out above should be understood by the reader as being disclosed also in combination with the other aspects of the present disclosure, where applicable. Similarly, it will be appreciated that any attendant advantages described in relation to any given aspect of the disclosure set out above should be understood by the reader as being disclosed as advantages of the other aspects of the present disclosure, where applicable. That is, the description of optional features and advantages in relation to a specific aspect of the disclosure above is not limiting, and it should be understood that the disclosures of these optional features and advantages are intended to relate to all aspects of the disclosure in combination, where such combination is applicable.

BRIEF DESCRIPTION OF THE DRAWINGS

Certain embodiments of the invention will now be described by way of example only, with reference to the accompanying figures, in which.

DETAILED DESCRIPTION

Figure 1:
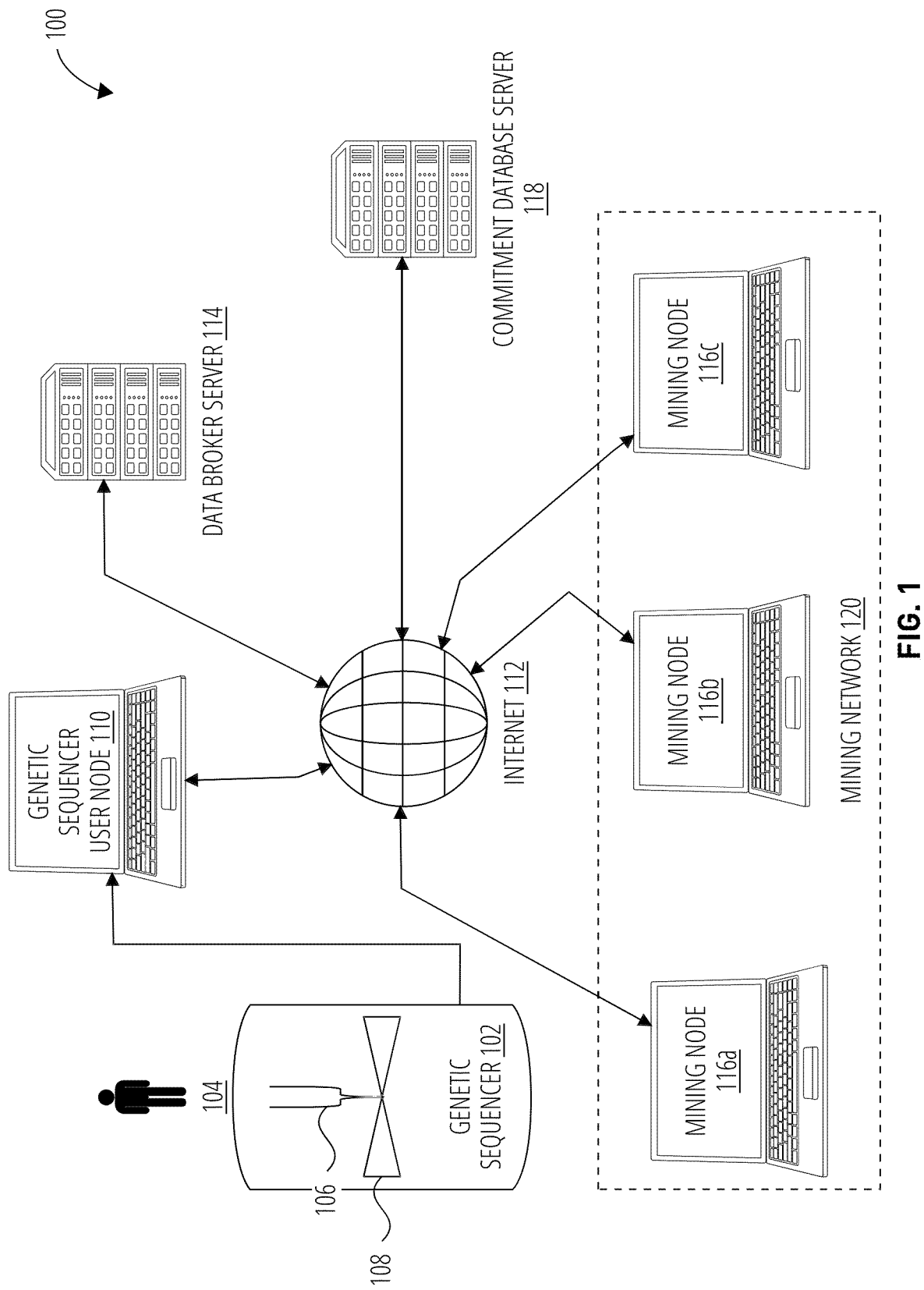
FIG. 1 shows an example system of networked apparatus for providing data packages derived from a genetic sequencer to mining nodes of a mining network for analysis, and for providing an externally verifiable proof of work usable for appending a block record to a blockchain, without needing to publish the private data output of the analysis, in accordance with aspects of the present disclosure.

Hereinafter, embodiments of the disclosure are described with reference to the accompanying drawings. However, it should be appreciated that the disclosure is not limited to the embodiments, and all changes and/or equivalents or replacements thereto also belong to the scope of the disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features. Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, reference to a first component and a second component may indicate different components from each other regardless of the order or importance of the components.

It will be understood that when an element (e.g., a first element) is referred to as being (physically, operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

The terms as used herein are provided merely to describe some embodiments thereof, but not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 shows an example system 100 of networked apparatuses for providing data packages derived from a genetic sequencer to mining nodes of a mining network for analysis, and for providing an externally verifiable proof of work usable for appending a block record to a blockchain, without needing to publish the private data output of the analysis, in accordance with aspects of the present disclosure.

The system 100 comprises a genetic sequencer 102 for extracting genetic signal information from a sample tube 106 containing polynucleotide strands from a biological organism 104, in this case a human subject. That is, the sample tube 106 may contain a sample of the DNA or RNA of the biological organism 104 suitably prepared for sequencing by the genetic sequencer 102.

The genetic sequencer 102 provides output data including a genetic signal information contained in the sample tube 106 to a computing apparatus, configured as a genetic sequencer user node 110. The genetic sequencer user node 110 takes a read of genetic signal information from the genetic sequencer 102 and passes it via Internet 112 to a data broker server 114 which arranges the genetic signal information in one or more data packages, which are then randomly distributed to plural mining nodes 116a, 116b, 116c . . . 116n (only mining nodes 116a-116c are illustrated) for analysis to extract, by computational work, a polynucleotide sequence from the genetic signal information.

For the purposes of the present disclosure, the genetic sequencer 102 and genetic sequencer user node 110 are merely provided to facilitate understanding of the operation of the system 100. The data broker server 114 may include a store of data packages of genetic signal information for processing by mining network 120 obtained from any suitable source. No direct connection is needed to a genetic sequencer or genetic sequencer user node 110.

In the embodiment, the example genetic sequencer 102 shown represents a third generation nanopore sequencer such as those available from Oxford Nanopore Technologies (https://nanoporetech.com/). However, the genetic signal information used in the system 100 can come from any suitable source and is not limited to this sequencing technology and can use genetic signal information provided by second generation sequencers, or any other suitable signal information that requires analysis or processing by computational work, that is suitable for processing by mining nodes 116a-116c in a mining network 120, where proof of work is usable for appending block records to a blockchain.

In the example of FIG. 1, the genetic sequencer 102 includes a transmembrane pore 108 (e.g. a nanopore) is used as an electrical biosensor for sensing genetic signal information in the form of the polynucleotides in a sequence in strands of DNA or RNA from the biological sample contained in the sample tube 106. Such transmembrane pores 108 can be used to identify small molecules or folded proteins and to monitor chemical or enzymatic reactions at approximately the single molecule level by means of sending the ion flow across the transmembrane pore 108, for example, as the strand of DNA/RNA passes through the pore. Interaction of an analyte with the transmembrane pore 108 can give rise to a characteristic change in ion flow (for example, a characteristic current profile) as the analyte translocates through the nanopore. That is, the ion flow (for example, electron flow/current) through a transmembrane pore 108 may be measured under a potential difference applied across the transmembrane pore 108.

Figure 2:
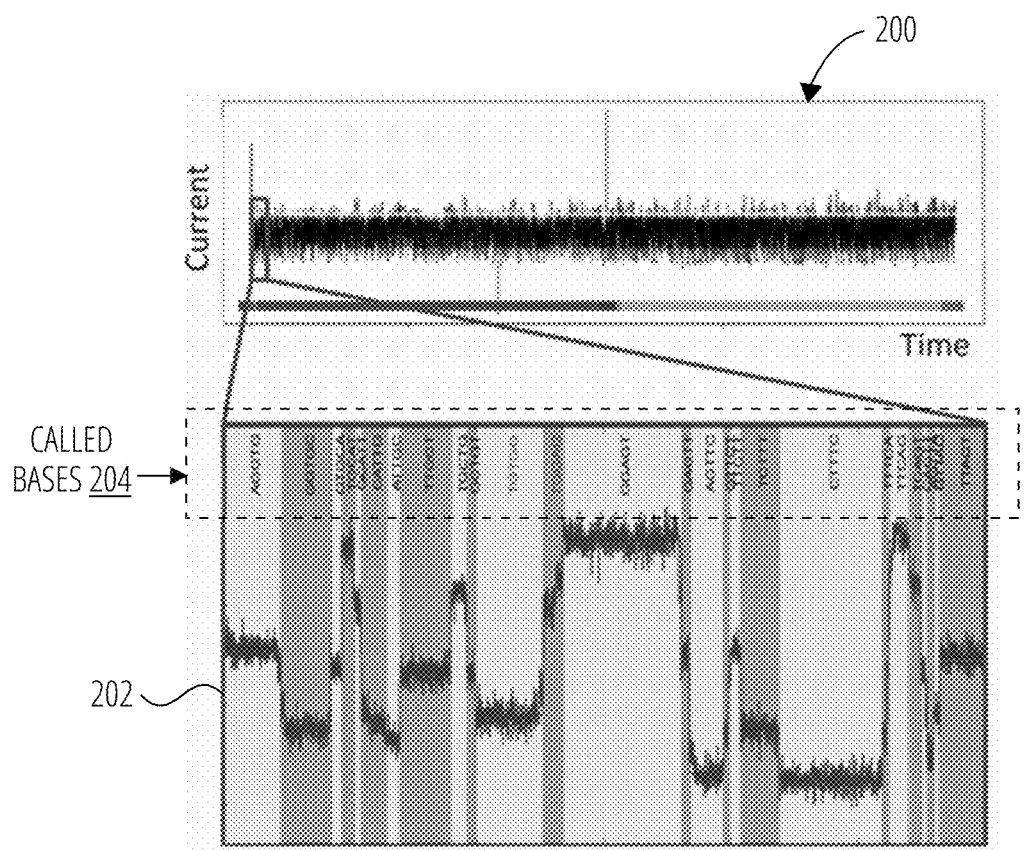
FIG. 2 shows a graph plotting signal information in the form of a current data output by the genetic sequencer shown in FIG. 1 over time, the signal information being provided to a mining node for analysis by the data broker server, and an example sequence of values generated by the mining nodes from analyzing the signal information, the sequence values representing a private data output.

A graph plotting an example of genetic signal information 200 by the genetic sequencer 102 over time is shown in FIG. 2. As can be seen, the plot shows the genetic signal information 200 in the form of ion flow/current signal information, the form of which is characteristic of the analyte passing through the transmembrane pore 108.

For example, as a polynucleotide strand such as DNA passes through the transmembrane pore 108, the nucleobases of the DNA (i.e. adenine (A), cytosine (C), guanine (G), and thymine (T)) that pass through the transmembrane pore 108 produce a resultant characteristic current profile depending on which combination of 4-5 nucleobases as part of the DNA strand is passing through the sequencer at any given moment. As can be seen in the genetic signal information 200 in FIG. 2, this produces a current signal that falls to different levels that change as each base leaves the pore and a new base enters at the top. Interpretation of the changes in the current can be decoded to infer the sequence of nucleobases on the DNA strand through a process of "base calling". The results of the base calling, giving a prediction of the called bases 204 for the different segments of the raw data, as shown overlaid above the detail 202 of a section of the genetic signal information 200 shown in the bottom pane of FIG. 2.

As can be seen, genetic signal information 200 produced by a genetic sequencer (a nanopore sequencer or otherwise) is typically very noisy due to, for example, electrical and environmental interference. In addition, the signal, as measured by the current passing through the pore, reflects the presence in the pore of 4-5 nucleotides which are part of the DNA strand. Accordingly, the task of base calling to determine a polynucleotide sequence (i.e. determining a "read") from the genetic signal information 200 is a computationally intensive task to complete, often requiring processing by artificial neural networks to analyze the genetic signal information 200. Thus, in order to determine the nucleobases in the raw genetic signal information 200, it needs to be processed by base calling using an often computationally intensive process, such as a deep neural network, to provide predictions of the nucleobases giving rise to the raw genetic signal information 200.

To facilitate the accurate sequencing of this genetic signal information 200, the mining network 120 (referring to FIG. 1) of a plurality of mining nodes 116a-116n (referring to FIG. 1) is used to provide distributed computation power to perform the base calling analysis of the genetic signal information 200.

That is, each genetic sequencer user node 110 (referring to FIG. 1) may send its unprocessed genetic signal information 200 via Internet 112 (referring to FIG. 1) to data broker server 114 (referring to FIG. 1) which is configured to assemble the genetic signal information 200 as a plurality of data packages and distribute them via Internet 112 among the plurality of mining nodes 116a-116n of mining network 120 for processing. Each mining node, on receipt of the data package, may analyze the genetic signal information 200 contained in the data package using an appropriate base calling software, such as a pre-trained artificial neural network, and generate as a private data output a sequence of nucleobases in the read, as genetic information which, for reasons of confidentiality, may not be shared publicly and is to be kept secret. The private data output is then sent by the mining nodes back to the data broker server 114, which then may assemble and store or relay the genetic sequence information for example for the benefit of the genetic sequencer user node 110.

As a record of the successful completion of the base calling work by the mining nodes, a blockchain may be maintained by the mining network 120, with block records being added when a mining node completes an analysis of a data package received from the data broker server 114, to the satisfaction of the validation requirements.

To provide an externally verifiable proof of work for each block record, the mining nodes 116a-116n are configured to post metadata commitment values and validation data to a commitment database in a commitment database server 118 (referring to FIG. 1). The entries in the commitment database may, by cross-validation, be usable to check that other mining nodes have processed the same data package and obtain the same private data output. This evidence allows the mining nodes to demonstrate that they have successfully completed the analysis work on the data package, without colluding with other mining nodes, and without needing to reveal the private data output or having to trust the data broker server to validate the work.

The configuration and operation of the mining nodes 116a-116c, commitment database server 118 and data broker server 114 for implementing the example system 100 will now be described in more detail, with reference to FIG. 3 to FIG. 8.

Figure 3:
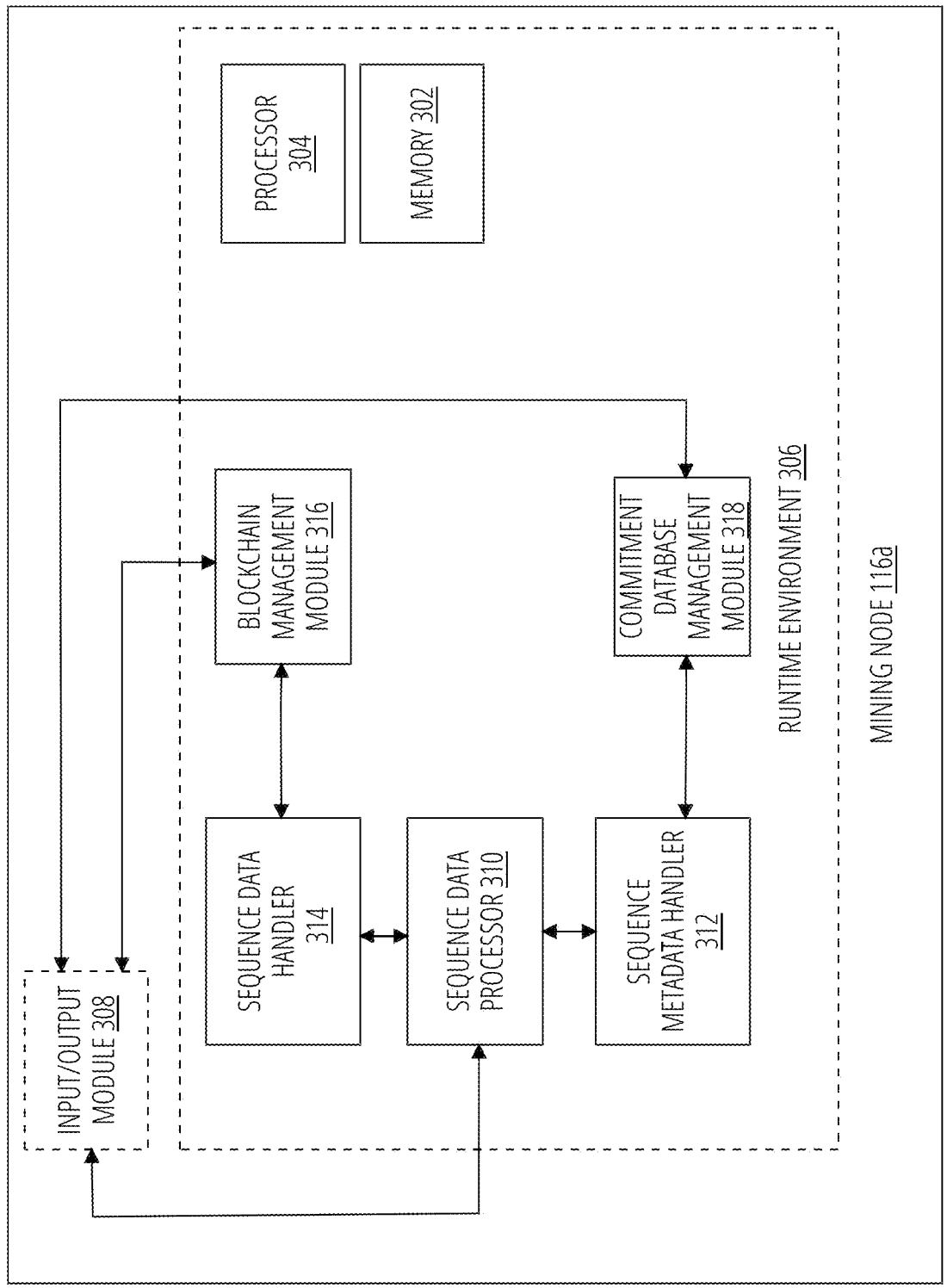
FIG. 3 shows a block diagram of an embodiment of a computing apparatus for use as a mining node shown in FIG. 1.
Figure 4:
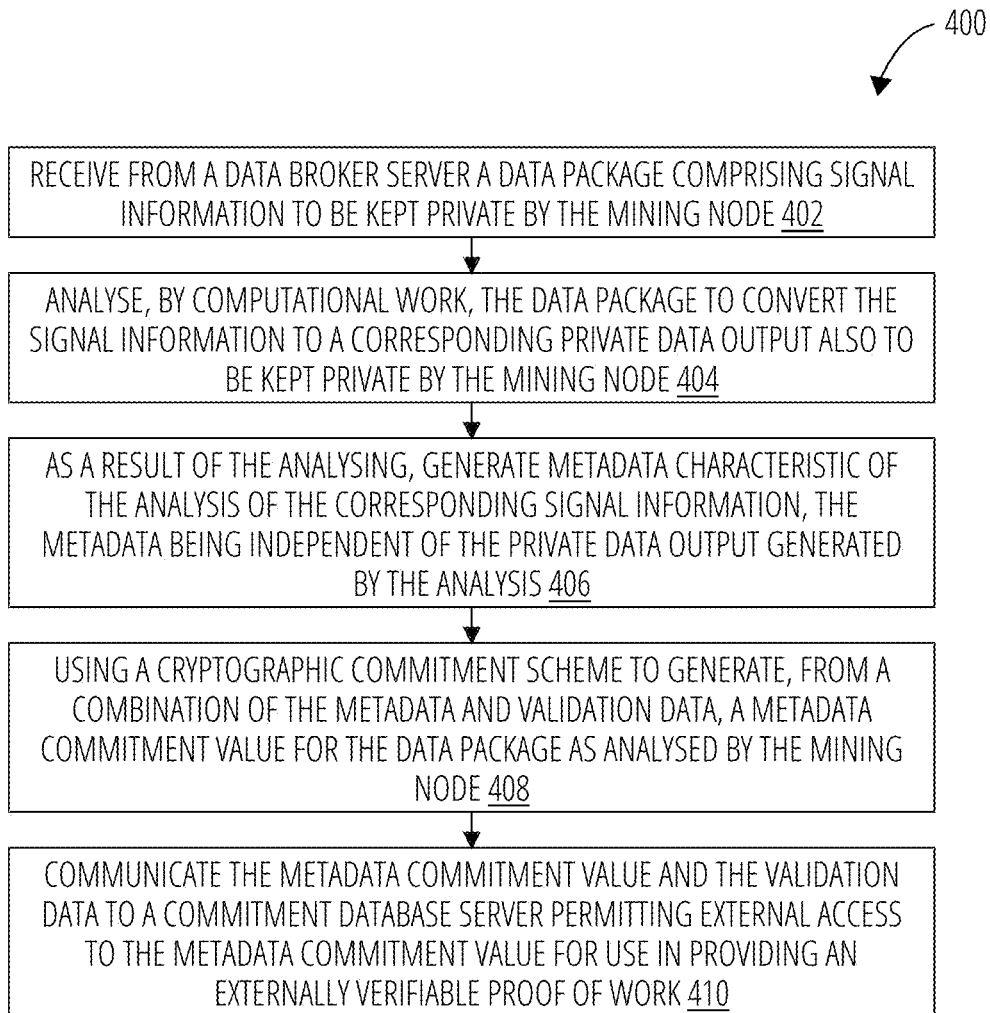
FIG. 4 shows an embodiment of a method for implementation by the example mining node as shown in FIG. 3 for establishing an externally verifiable proof of work as immutable evidence of computational work completed by the mining node to generate a private data output, the proof of work being for use in appending a block record to a blockchain.

Reference will now be made to FIG. 3 and FIG. 4 to describe how, responsive to the receipt of a data package, mining node 116a-116n generates a private data output, metadata and posts a metadata commitment value to a commitment database for use as an externally verifiable proof of work when adding a block record to a blockchain.

FIG. 3 shows a block diagram of an embodiment of a computing apparatus for use as a mining node shown in FIG. 1. Although FIG. 3 refers to mining node 116a, this is for illustration and by way of example only, and it is to be understood to explain the configuration and operation of any mining node 116a-116n of mining network 120 (referring to FIG. 1).

The mining node 116a, comprises memory 302, one or more processors 304 and an input/output module 308. A bus system (not shown) may be provided which supports communication between at the least one processor 304, memory 302 and input/output module 308.

The processor 304 executes instructions that can be loaded into memory 302. The processor 304 can include any suitable number(s) and type(s) of processors or other devices in any suitable arrangement. Example types of processor include microprocessors, microcontrollers, digital signal processors, field programmable gate arrays and application specific integrated circuits.

The memory 302 may be provided by any structure(s) capable of storing and facilitating retrieval of information (such as data, program code, and/or other suitable information on a temporary or permanent basis). The memory 302 can represent a random access memory or any other suitable volatile or non-volatile storage device(s). The memory 302 may also contain one or more components or devices supporting longer-term storage of data, such as a read only memory, hard drive, flash memory, or optical disc, which may store software code for loading into the memory 302 at runtime. In use, the processor 304 and memory 302 provide a runtime environment 306 in which instructions or code loaded into the memory 302 can be executed by the processor 304 to generate instances of software modules in the runtime environment 306.

The mining node 116a also comprises input/output module 308 providing a communications interface for receiving, via a network such as Internet 112 (referring to FIG. 1), data from one or more data broker servers 114 (referring to FIG. 1) and commitment database servers 118 (referring to FIG. 1).

Although shown in FIG. 1 as a standalone computing apparatus, the mining node 116a may be configured as a networked server or as a virtual machine implemented in a cloud computing service, any of which may be suitable for carrying out the genetic signal information analysis, proof of work-generating and block record-appending methods described herein.

In the example, the memory 302 comprises instructions for instantiating software modules corresponding to a sequence data processor 310, a sequence metadata handler 312, a sequence data handler 314, a blockchain management module 316 and a commitment database management module 318. The function and operation of these modules will now be described with reference to FIG. 4.

FIG. 4 shows an embodiment of a method 400 for implementation by the example mining node as shown in FIG. 3 for establishing an externally verifiable proof of work as immutable evidence of computational work completed by the mining node to generate a private data output, the proof of work being for use in appending a block record to a blockchain.

In the method 400, in step 402, the mining node 116a (referring to FIG. 1) receives, via input/output module 308 (referring to FIG. 3), from data broker server 114 (referring to FIG. 1) a data package comprising signal information to be kept private by the mining node 116a. In the example embodiment, the data package is representative of the genetic signal information 200 of the type shown in FIG. 2. The data package may be passed to the sequence data processor 310 (referring to FIG. 3) which may store it in memory 302 (referring to FIG. 3) for analysis using an appropriate analysis tool.

The data package may comprise at least one data entity, wherein each data entity comprises genetic signal information representative of a polynucleotide sequence in the sense that it comprises current information corresponding to current flow through a nanopore and a polynucleotide translocating through the nanopore. In other embodiments, the data package may include any other form of signal information for processing by one or more mining nodes. For example, the signal information may represent batches of images for analysis by object recognition algorithms, the images needing to be kept private, or batches of documents needing to be processed by optical character recognition to convert them to a machine readable format.

In step 404, the sequence data processor 310 analyses, by computational work, the data package to convert the signal information to a corresponding private data output also to be kept private by the mining node.

In this step, in the example shown in FIG. 1, the genetic signal information 200 output by the genetic sequencer 102 may be analyzed by the sequence data processor 310 carrying out a suitable algorithm for performing base calling to determine the sequence of nucleobases of the DNA/RNA molecules in the sample tube 108. Converting the genetic signal information 200 to a corresponding private data output may comprise converting the genetic signal information 200 to a corresponding read, each read of the plurality of reads for each data entity describing the respective polynucleotide sequence. The polynucleotide sequence may comprise a deoxyribonucleic acid, DNA, sequence or a ribonucleic acid, RNA, sequence. In embodiments, the signal information may comprise raw data produced by a nanopore sequencer. Specifically, the sequence data processor 310 may analyze the data package using a pre-trained neural network to convert the signal information to the private data output. This base calling process generates called bases predicting the nucleobases that passed through the nanopore to generate the current signal analyzed in the genetic signal information. To illustrate this, in FIG. 2, the called bases 204 output as a private data output by sequence data processor 310 are shown overlaid above the detail 202 of the genetic signal information 200. In applying the sequence data processor 310 to the data package, a significant amount of computational work is expended by mining node 116a, in particular as the data package may contains a number of data entities each corresponding to the current trace from the genetic sequencer 102 from a single DNA fragment passing through the transmembrane pore 108 (referring to FIG. 1). The data package received from the data broker server 114 may specify one or more computer program products or algorithms to be used by the mining node 116a in analyzing the data package. If that is the case, the sequence data processor 310 uses the computer program product of algorithm specified.

The operation of the sequence data processor 310 on each data entity may generate a read of the DNA fragment being analyzed, the read being a representation the basecalled DNA sequence of nucleobases (A, C, G, T) in a suitable data structure, such as a FASTQ format. An example private data output for a data entity in a data package by the sequence data processor 310 is shown below:

```
@5d08ebdf-4b02-45bf-ac72-8e5716ca468d
runid=3b55a2b916b3c56c641a45f4898b156692a08534
sampleid=Strawb_leaf
read=1440
ch=2028
start_time=2018-08-30T15:49:09Z
ATCATTACTTCGTTCGAACCGTATTGCTCTTGATTTTCCTACTTTGTTTA
CTAGTTTTAGACTTGATTTTATATTGTGTAGTTGCTTTAACTTAGTTTTA
TTTCATTATAAACTGGTTTTATAACATTTGATAATAGATTACGCTTTGAG
GTTTTTATGGCTAGAGGCGTGCCTTAAGCACTCTCAGGCGGCGCCTGGGC
TCAGGGTCGCCCTGGCCTAGGTGCGCCTAGGGCCTTTTAATCATAATGAG
TATTTTAACGCCGAATAGAATAAGATTATTCTTTCAAGGCAATTCCTGCA
CTTCTTTTTTTCTTGCCATCTGTATCATTGGTTTATGAGATTCTGCCTTC
TCATAGCTAACATTATCATCTATCGCTATACGTTGTACTGATTTACTTCC
TTATTTGTGATACATTTTGCGCTTAGTTGTGCCTCTTTGTTGTTCAGTCA
CATTTTCACCATATGTAAGCGAATACTGCATACTTTGGAAACTGGCATGC
TCTCTATTGCTGCTTCATATCTTGAAATGAACTCTGTTTCTCTTTGTCAA
AAGAACTAACCTTGAGATAAACAGTTCTTTGTTTTCTATCTTTAGGAGTG
CCACTTGTCGTGGCCAATTTATTTGGTGTTATCTTGAGGATAAGTGTATG
CCAAATGAGACTAAGATTCTTCTGTGCCTTAGTTTTATTCTCATAGCTCC
TGATAAACCATTTCTTAGGTTAATTTGCAATTTAAATGTGGAGCGTCTCA
GGTGAATATCTTGACACACACTGCAAGTCAAACTTAAAACTGAACAGCTG
AAAGAAATGCCTAAGTTGAAGCAACAGCACATTACATAAAGATCAAGTTG
AATTGTATGAGTCGTGGTATGGGCCGTGAATGGGTGATACTTGCCTTGCT
GCTCGCAGTGCTTCTGAGCGCGGTTACCTACAGCAGATGTTATAGTTGAT
GTCAAGCTGCACATGTTAAGCTAAGTCAATGATGGATCTGGAACACTATG
TCCTGGAACTGGTCAAAAACTTCGGTCTCCACAT
```

The base called data shown above for a single read includes a header indicating a data package identifier as randomly assigned to the data package by the data broker server (in the example, this is "@5d08ebdf-4b02-45bf-ac72-8e5716ca468d") and a run identifier (in this example "runid=3b55a2b916b3c56c641a45f4898b156692a08534") as well as further information concerning the sample, the read size, start time, etc, to provide tracking data for the original of the read. The base called reads are then passed to a sequence data handler 314 (referring to FIG. 3) and stored in a payload showing the sequence of nucleobases for sharing with the data broker server 114. This data needs to be kept private so long as the genetic sequencer user node 110 (referring to FIG. 1) does not consent to the genetic sequence information for the reads from the biological organism 104 (referring to FIG. 1) being shared by the data broker server 114 with anyone other than the user. This nominally prevents any blockchain network entity other than the data broker server 114 from being able to verify the private data output generated by mining nodes for a data package, for example by cross-checking the private data outputs generated by plural mining nodes for the same data package.

To allow external verification by entities other than the data broker server 114, metadata generated by the sequence data processor 310 for a read of the data package, which does not need to be kept private, is used.

That is, in step 406, the sequence data processor 310, as a result of the analyzing, also generates metadata characteristic of the analysis of the corresponding signal information, the metadata being independent of the private data output generated by the analysis. The metadata may be based on a score produced by the neural network, the score being representative of the probability of correctness of the private data output and/or a quality of the input signal information. That is, when the base calling software determines which base is at each position in the DNA sequence, it assigns a probability-based quality score to the base, which can be used by downstream software. The quality score is calculated as $q = -10 \log_{10}(p)$, where p is the probability that the base call is incorrect. An example quality string generated by the sequence data processor 310 and stored alongside the base called data in the FASTQ data structure for the read shown above is as follows:

contain no mutual information. The metadata is deterministically produced as a by-product of the analysis of the data package to convert the signal information to the private data output. The metadata and the metadata commitment value are usable as evidence to indicate a private data output of an analysis of the data package by the mining node. Because this quality data is independent of the DNA sequence, but still requires that the computation effort of base calling is undertaken to produce it, it can be used by e.g. any other mining node to openly validate that two miners have run the base calling software on the data entity, and have produced the same private data output, without the private data output having to be revealed or the verifying miner also having to decode the sequence in the data package to confirm this.

To allow the mining nodes to verify that each has got the same sequence of quality scores without sharing the quality scores (which would enable collusion), a cryptographic commitment scheme and a commitment database are used.

That is, in step 408, the sequence data processor 310 passes the metadata to a sequence metadata handler 312 (referring to FIG. 3) which uses a cryptographic commitment scheme to generate, from a combination of the metadata and validation data, a metadata commitment value for the data package as analyzed by the mining node. The validation data may comprise one or more of: a mining node

```
)$$$$%%$%'+*)/3/*+,5424-4.+,..-0+'0::1190.1/6)*-88-//0,1:;.37977944.781(-"&(#,$)(+-
+( ).5-,('0,&.16:1'1;7.344..09<89734;<3/34:+)57+.//-82$$(+%$&$&*.( )(.9-8;:--
111/0%&%$&&)*'((**'"'$%$( )'&)####%**)16-
+,5)'++48321"#$$%%$*)*$)&&$&&+./&17557020*-&%%$%*(/-$&'&9::*04/##"#"#**)*742-
)*/,&*/'"-1+-.-.0/-***,)67:9:.,567:787*2.%$&&'+/(+*,-36<+6499++',$$2:4613539,+*
   )(+*20-2)&**))6-0112:91.50/%'(1:41/11054<8248596)7*+71+-.43222+:;)'*#+/1/1-
;/107:882;8.0:58:64583*-*19:6,05804.4'(&(%(&'5-++*(+)-&/3/0-%-2('+0.01-+,,,11.#$$$(-
(,,50470.-*,(#%&$,,8187766<<8988<95692:9/),611272846('*,,/:4//1694.:3*-4:001,,)052.-%)&-
,/75343)-)'+$$'"%(/,:1,/53*,)--:*++-/,-.433('$#$&&,+243791,*8+460*)+/3-
'*%((7167/8./,;<2,/9122225*++040.110.'4842:3.092250:/2.;6'.,(.)&*,*+%4(+'(.-2/,-,1100297-
799:323.000./1211( )*.-02-.8/<98./..9://..-/6/%(-+'$+*+-2/0/#%-'/.)/-),-0+.)'%%$&***,-.+5+06-
.(2('*+0("#$'%'),+/073)'$&(+,9866( )-.00308/0715--.&"&(("&"&,)$#,-
,2&&&%)0(/7/)")%&/1&+-"$#&,2/022703613-,+++/1$11&%#%&-
,24715*))+596896788864(++10310))1-56689772;0-,&%&-*6/27'####
```

The quality metadata contains one character for each base in the DNA in the read, and the quality score can be calculated as the ordinal value of the character minus 33. This integer value is calculated by the base calling software as $-10 \log_{10}(p)$, where p is an estimate that the call for that base is incorrect. This quality score is a measure of the quality of the raw signal data and is not related in any way to the base that is called from the signal. Given that, for any version of the base calling software (and any version of the neural network model) these scores are deterministically calculated, any two mining nodes will produce the same sequence and the same quality data for a given input. This should be true regardless of e.g., the architecture that the software is run upon.

This quality data can be used in the analysis of the sequence data, for example to provide a measure of reliability for each base of the sequence, particularly when constructing consensus sequences at the data broker server during alignment. However, the quality string can also be used as metadata allowing external verification by using a cryptographic commitment scheme and a commitment database server 118 (referring to FIG. 1).

That is, the analyzing of the data package by the mining node 116a outputs the same quality metadata for the same genetic sequence information as a private data output produced by the analysis. The metadata and private data output identifier for the mining node performing the analysis of the data package; a data package identifier for the data package, as assigned by the data broker server; a cryptographic nonce. In this way, the metadata commitment value for the identical metadata output for the same data package may be different for each mining node. The data package identifier assigned by the data broker server for the same data package may be different for each mining node assigned with analyzing the data package. This can prevent collusion between mining nodes as they cannot identify other mining nodes processing the same data package.

Any suitable cryptographic commitment scheme can be used that enables the mining node 116a to generate and first reveal only a 'commitment' (i.e. the metadata commitment value, different to the metadata itself) to some hidden value (i.e. the metadata itself), and later 'open' the commitment (by revealing the hidden value, i.e. the metadata). The cryptographic commitment scheme must enable the public (or at least any other mining node) to re-use the cryptographic commitment scheme to verify that the commitment value (i.e. the metadata commitment value) corresponds to the opening (the 'correctness' property—i.e. that the cryptographic commitment scheme generates the metadata commitment value from the metadata itself, and any validation data used to generate the metadata commitment value). The cryptographic commitment scheme must also guarantee that given only the commitment (i.e. the metadata commitment value) the opening (i.e. the metadata used to generate it) remains hidden (the 'hiding' property, which is that the metadata cannot be worked out from the metadata commitment value). Finally, the cryptographic commitment scheme must be one in which a commitment cannot be opened in multiple different ways (i.e. the 'binding' property that the metadata commitment value actually binds the committer to the one hidden metadata value). The cryptographic commitment scheme may be a cryptographic hash function, such as SHA256 or SHAKE256, as these are particularly efficient as cryptographic commitment schemes. However, any suitable cryptographic commitment scheme can be used.

Where a cryptographic hash function is used, in step 408, the generated metadata commitment value may be a hash of a combination of the metadata for all data entities in the data package and the validation data. The combination may be a concatenation of the quality strings. The validation data used is such that the metadata commitment value is different for each mining node analyzing the data package and producing the same metadata output and the same private data output. This facilitates external verification and prevents collusion.

To allow cross-checking between mining nodes, and subsequent externally verification that a mining node as successfully completed the computational work to generate a valid private data output, in step 410, the sequence metadata handler 312 of the mining node 116*a* communicates (via input/output module 308) the metadata commitment value and the validation data to commitment database server 118 via Internet 112. The commitment database server 118 permitting external access to the metadata commitment value for use in providing an externally verifiable proof of work.

The method may further comprise the mining node 116*a* communicating the private data output for the data package to the data broker server 114 which may validate, align and assemble all the reads, as generated by the mining network 120, for the data set for all the genetic signal information received from the genetic sequencer 102 for biological organism 104 and share them with the genetic sequencer user node 110.

The operation of the commitment database server 118 and the mining nodes to allow externally verification of the work done by mining on the data packages, and subsequent use as a proof of work in a blockchain network, will now be described in relation to FIG. 5 and FIG. 6.

Figure 5:
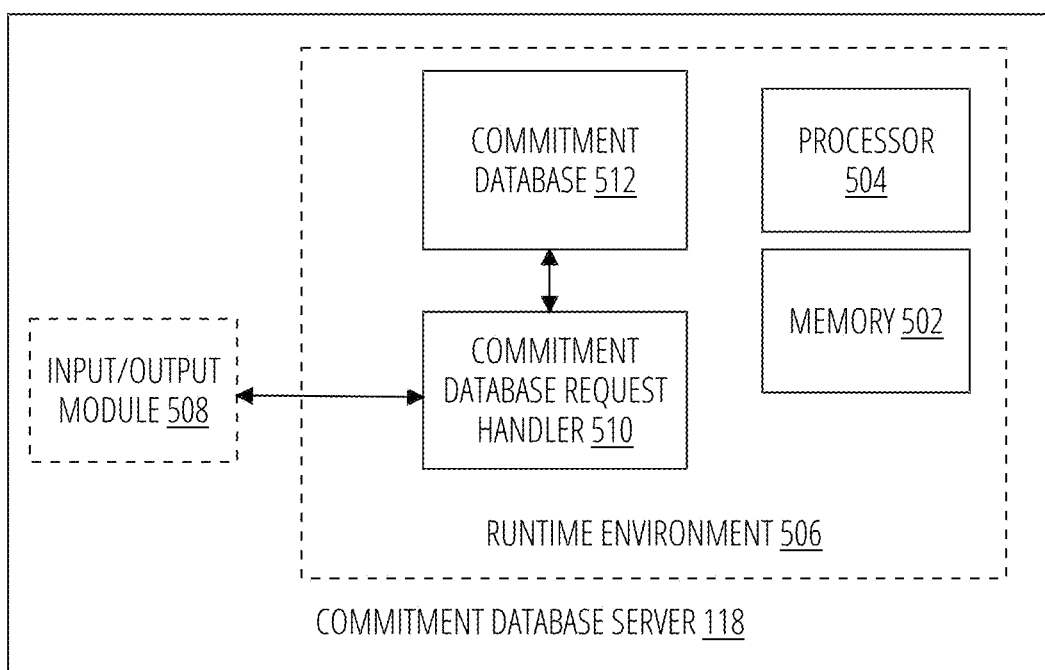
FIG. 5 shows a block diagram of an embodiment of a computing apparatus for use as a commitment database server shown in FIG. 1.

FIG. 5 shows a block diagram of an embodiment of a computing apparatus for use as a commitment database server 118. The commitment database server 118, comprises memory 502, one or more processors 504 and an input/output module 508. A bus system (not shown) may be provided which supports communication between at the least one processor 504, memory 502 and input/output module 508.

The processor 504 executes instructions that can be loaded into memory 502. The processor 504 can include any suitable number(s) and type(s) of processors or other devices in any suitable arrangement. Example types of processor include microprocessors, microcontrollers, digital signal processors, field programmable gate arrays and application specific integrated circuits.

The memory 502 may be provided by any structure(s) capable of storing and facilitating retrieval of information (such as data, program code, and/or other suitable information on a temporary or permanent basis). The memory 502 can represent a random access memory or any other suitable volatile or non-volatile storage device(s). The memory 502 may also contain one or more components or devices supporting longer-term storage of data, such as a read only memory, hard drive, flash memory, or optical disc, which may store software code for loading into the memory 502 at runtime. In use, the processor 504 and memory 502 provide a runtime environment 506 in which instructions or code loaded into the memory 502 can be executed by the processor 504 to generate instances of software modules in the runtime environment 506.

The commitment database server 118 also comprises input/output module 508 providing a communications interface for receiving, via a network such as Internet 112 (referring to FIG. 1), data from one or more data broker servers 114 (referring to FIG. 1) and mining node 116*a*-116*n* (referring to FIG. 1).

Although shown in FIG. 5 as a standalone computing apparatus, the commitment database server 118 may be configured as a networked server or as a virtual machine implemented in a cloud computing service, any of which may be suitable for carrying out the method described below in relation to FIG. 6.

In the example, the memory 502 comprises instructions for instantiating software modules corresponding to a commitment database request handler 510 and a commitment database 512. The function and operation of these modules will now be described with reference to FIG. 6.

Figure 6:
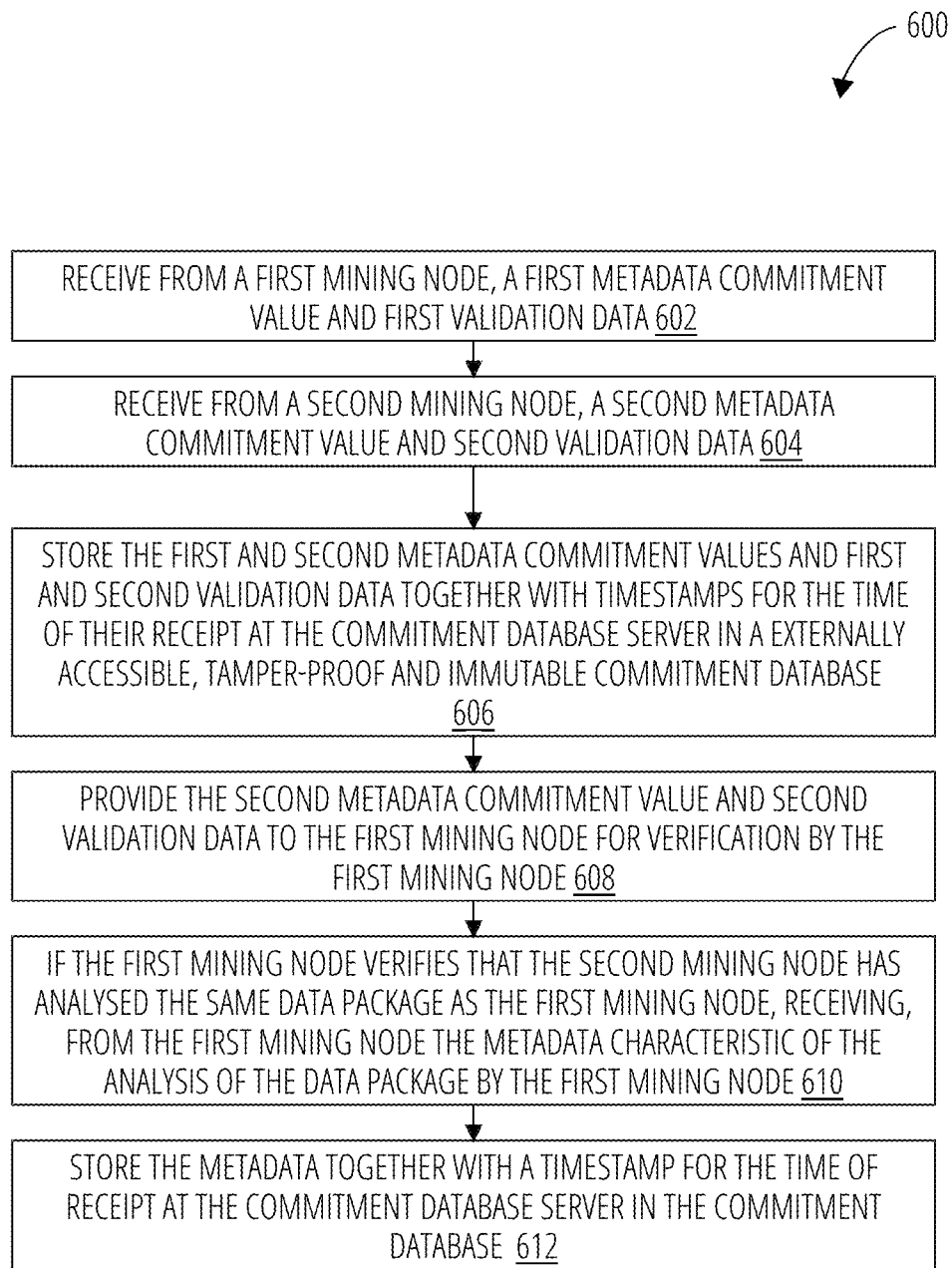
FIG. 6 shows an embodiment of a method for implementation by the example commitment database server as shown in FIG. 5 for use in conjunction with a plurality of example mining nodes as shown in FIG. 3.

FIG. 6 shows an embodiment of a method 600 for implementation by the example commitment database server as shown in FIG. 5 for use in conjunction with a plurality of example mining nodes as shown in FIG. 3.

In step 602, the commitment database server 118 (referring to FIG. 1) receives at an input/output module 508 (referring to FIG. 5) via Internet 112 (referring to FIG. 1), from a first mining node (e.g. mining node 116*a*), a first metadata commitment value and first validation data. This may be the output of step 410 (referring to FIG. 4) performed by mining node 116*a*. The commitment database request handler 510 (referring to FIG. 5) receives the first metadata commitment value and stores it in the commitment database 512 (referring to FIG. 5) together with a timestamp.

In step 604, the commitment database server 118 receives at an input/output module 508 via Internet 112, from a second mining node (e.g. mining node 116*b*), a second metadata commitment value and second validation data. This may be the output of step 410 performed by mining node 116*b*. The commitment database request handler 510 receives the second metadata commitment value and stores it in the commitment database 512 together with a timestamp.

Thus in step 606, the commitment database server 118 stores the first and second metadata commitment values and first and second validation data together with timestamps for the time of their receipt at the commitment database server in an externally accessible, tamper-proof and immutable commitment database 512. The commitment database 512 is maintained as an immutable and tamper-proof record of data entered to it, and so provides permanent and evidence of work done and metadata commitment values generated and posted by the mining nodes of the mining network 120 (referring to FIG. 1). To achieve this, the commitment database 512 may be maintained itself as a blockchain across multiple nodes of the blockchain network.

In generating the first metadata commitment value and second metadata commitment value, the first mining node 116*a* and second mining node 116*b* may (or may not) have successfully performed the same analysis on the same data package. The metadata commitment values stored in the commitment database 512 allow cross-checking by the mining nodes to determine whether any other mining nodes have analyzed the same data package and achieved the same result, to allow them to provide an externally verifiable proof of work for appending a block record to the blockchain.

To this end, in step 608, the commitment database request handler 510 provides the second metadata commitment value and second validation data to the first mining node 116*a* for verification by the first mining node 116*a*. This may be sent as a result of a request from the first mining node.

The verification of the second metadata commitment value by the first mining node 116*a* in a process carried out in the first mining node 116*a* will now be described.

On receiving, via the input/output module 308 (referring to FIG. 3) the second metadata commitment value and second validation data from the commitment database server, mining node 116*a* passes the second metadata commitment value and second validation data to sequence metadata handler 312 (referring to FIG. 3) for verification that the second mining node has produced matching metadata as a result of the analysis performed on the (same or different) data package. The validating of the second metadata commitment value by the first mining node 116*a* includes using the cryptographic commitment scheme (each mining node is specified to use the same cryptographic commitment scheme) to generate, from a combination of the first metadata for the data package generated by the mining node 116*a* and the received second validation data, a recreated second metadata commitment value for the data package.

That is, the mining node 116*a* is testing whether it can recreate the second metadata commitment value using metadata it itself generated by analyzing data packages, by hashing it together with the second validation data received from the commitment database 512. Thus validation is performed by the mining node 116*a* comparing the recreated second metadata commitment value and the second metadata commitment value generated by the second mining node received from the commitment database 512 together with the second validation data. If the comparing indicates the recreated second metadata commitment value and the received second metadata commitment value match, the mining node 116*a* may validate that the second mining node has successfully performed the same analysis of the data package to generate the same metadata and the same private data output. Based on the validating, the mining node 116*a* may communicate the metadata for the data package to the commitment database server permitting external access to the metadata for durable storage therein. This is to 'open' the hiding, and further enable external verification of the work done by the mining node 116*a* (not least by virtue of the metadata being posted with a later timestamp than the metadata commitment value and validation data).

Thus in step 610, if the first mining node 116*a* verifies that the second mining node 116*b* has analyzed the same data package as the first mining node 116*b* (and achieved the same result), the commitment database server 118 receives from the first mining node 116*a* the metadata characteristic of the analysis of the data package by the first mining node 116*a*.

In step 612, the commitment database request handler 510 stores the metadata together with a timestamp for the time of receipt at the commitment database server 118 in the commitment database 512. Thus the timestamped metadata received from the first mining node 116*a* may be stored alongside the earlier received timestamped first metadata commitment value and first validation data.

As the first and second metadata commitment values are contained in the externally accessible, time stamped, immutable and tamper-proof commitment database 512, the mining node 116*a* can use the entry of the first metadata commitment value and first validation data in the commitment database 512 as an externally verifiable proof of work. Thus, the external access from the commitment database server to the or each metadata commitment value and the or each respective validation data for each metadata commitment value, and the subsequently revealed metadata, may allow a proof of work by verification that each metadata commitment value produced by each mining node was produced using the cryptographic commitment scheme from a combination of their respective validation data and the matching metadata produced by the analysis performed at each mining node. The metadata stored in the commitment database 512 further enables this external verification.

The mining nodes may watch the commitment database and attempt to validate metadata commitment values posted thereto by cross-checking against the metadata produced by the mining node in as-yet unvalidated data packages to attempt to find identical metadata produced by other mining nodes that may have analyzed the same data package and produced the same metadata.

The operation of the data broker server 114 for distributing data packages will now be described in relation to FIG. 7 and FIG. 8.

Figure 7:
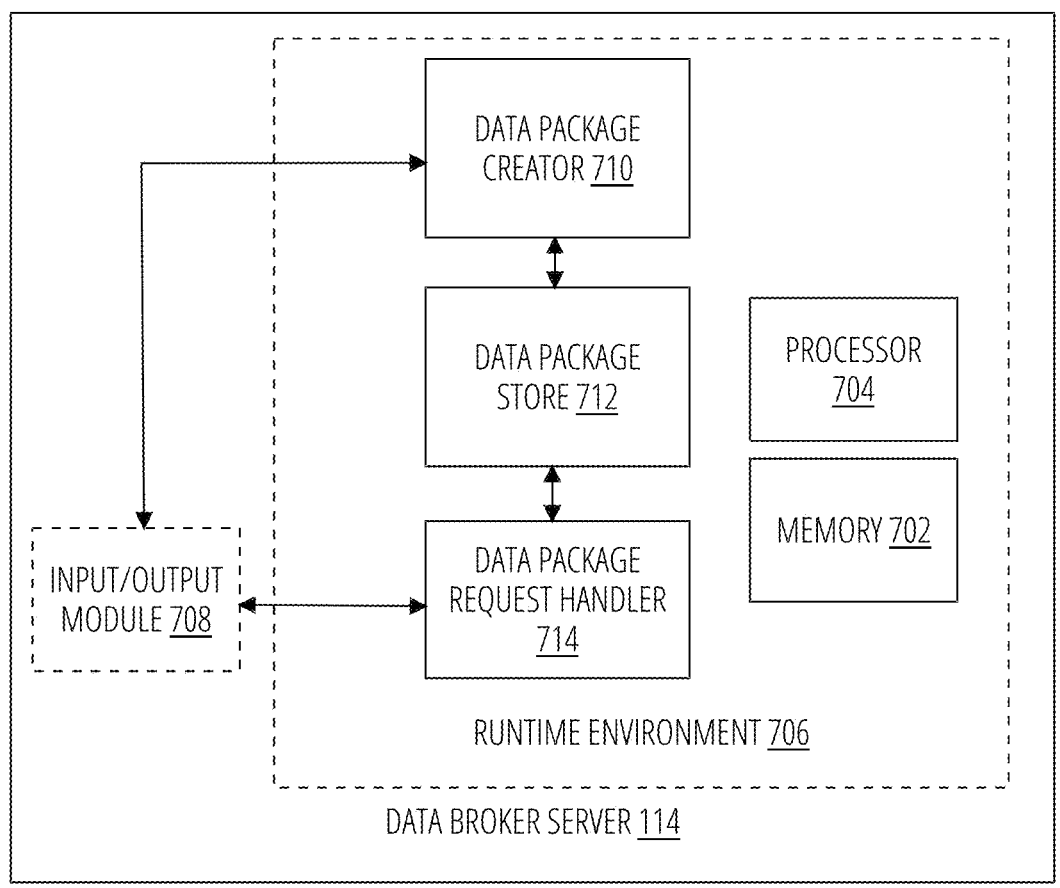
FIG. 7 shows a block diagram of an embodiment of a computing apparatus for use as a data broker server shown in FIG. 1.

FIG. 7 shows a block diagram of an embodiment of a computing apparatus for use as a data broker server 114 shown in FIG. 1.

The data broker server 114 comprises memory 702, one or more processors 704 and an input/output module 708. A bus system (not shown) may be provided which supports communication between at the least one processor 704, memory 702 and input/output module 708.

The processor 704 executes instructions that can be loaded into memory 702. The processor 704 can include any suitable number(s) and type(s) of processors or other devices in any suitable arrangement. Example types of processor include microprocessors, microcontrollers, digital signal processors, field programmable gate arrays and application specific integrated circuits.

The memory 702 may be provided by any structure(s) capable of storing and facilitating retrieval of information (such as data, program code, and/or other suitable information on a temporary or permanent basis). The memory 702 can represent a random access memory or any other suitable volatile or non-volatile storage device(s). The memory 702 may also contain one or more components or devices supporting longer-term storage of data, such as a read only memory, hard drive, flash memory, or optical disc, which may store software code for loading into the memory 302 at runtime. In use, the processor 704 and memory 702 provide a runtime environment 306 in which instructions or code loaded into the memory 702 can be executed by the processor 704 to generate instances of software modules in the runtime environment 706.

The data broker server 114 also comprises input/output module 708 providing a communications interface for receiving, via a network such as Internet 112 (referring to FIG. 1), data from one or more mining nodes 116*a*-116*n* (referring to FIG. 1) and commitment database servers 118 (referring to FIG. 1).

Although shown in FIG. 1 as a standalone computing apparatus, the data broker server 114 may be configured as a networked server or as a virtual machine implemented in a cloud computing service, any of which may be suitable for carrying out the methods described herein.

In the example, the memory 702 comprises instructions for instantiating software modules corresponding to a data package creator 710, data package store 712 and data package request handlers 714. The function and operation of these modules will now be described with reference to FIG. 8.

Figure 8:
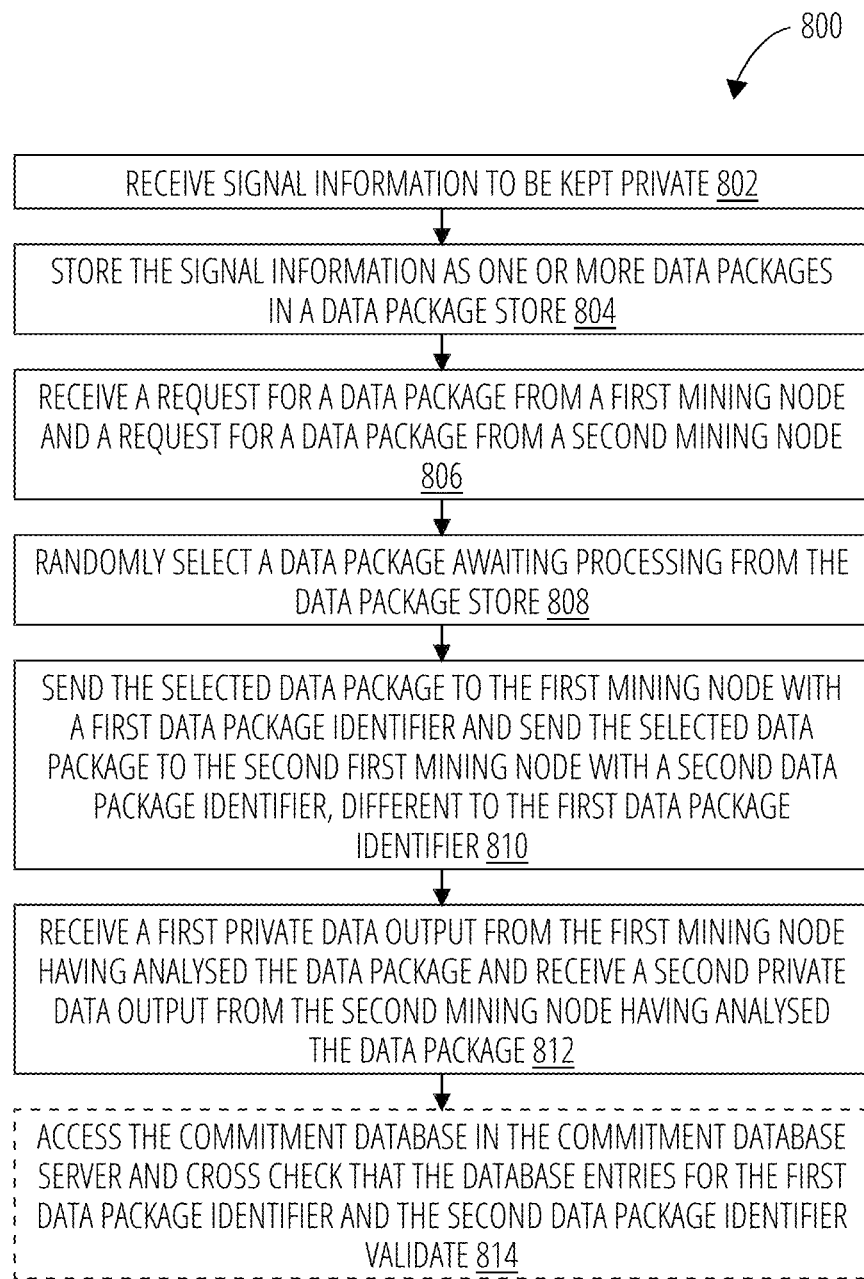
FIG. 8 shows an embodiment of a method for implementation by the example data broker server as shown in FIG. 7 for use in conjunction with an example commitment database server as shown in FIG. 5 and a plurality of example mining nodes as shown in FIG. 3.

FIG. 8 shows an embodiment of a method 800 for implementation by the example data broker server as shown in FIG. 7 for use in conjunction with an example commitment database server as shown in FIG. 5 and a plurality of example mining nodes as shown in FIG. 3.

Generally, the data broker server 114 (referring to FIG. 1) receives datasets from the sequencing users (such as genetic sequencer user node 110), and then creates work packages of data entities for the mining nodes to process. Once all data entities from a dataset have been basecalled by the mining nodes, the data broker server 114 returns the assembled based called data to the sequencing user Thus in the method 800, in step 802 the data broker server 114 receives, via input/output module 708 (referring to FIG. 7), signal information to be kept private such as genetic signal information 200 (referring to FIG. 2) in the form of a dataset produced by genetic sequencer 102 (referring to FIG. 1) processing a sample from biological organism 104 (referring to FIG. 1).

The received signal information is passed to data package creator 710 (referring to FIG. 7), which configures and stores the signal information as one or more data packages in data package store 712 (referring to FIG. 7). For example, the data broker server 114 may divide up the received signal information (for example by separating the reads of the genetic sequencer 102) and randomly group them together into packages of signal information to be processed. This helps to mask the signal information and prevent the reassembly by the mining nodes of the genetic sequence information of the biological organism 104, which is to be kept private.

Once the data packages have been assembled and stored ready for processing, the data broker server 114 may publish the data packages that need processing to the mining nodes, to allow the mining nodes to request a data package to work on. Thus, in step 806, the data broker server 114 receives, via input/output module 708, a request for a data package from a first mining node 116a (referring to FIG. 1) and a request for a data package from a second mining node 116b (referring to FIG. 1). These requests are passed to the data package request handler 714 (referring to FIG. 7) for processing.

In step 808, the data package request handler 714 randomly selects a data package awaiting processing from the data package store.

In step 810, the data package request handler 714 sends, via the input/output module 708, the selected data package from the data package store 712 to the first mining node 116a with a first data package identifier and to the second first mining node 116b with a second data package identifier, different to the first data package identifier. In this way, the first and second mining nodes 116a,b do not know they are in receipt of the same data package and collusion is averted. As the data packages are randomly allocated, it is impractical for mining nodes to try to find other mining nodes in the mining network 120 (referring to FIG. 1) that are in receipt of the same data package and so collusion is averted.

In embodiments, at least one further of the mining nodes 116c-116n may been sent the data package for analysis, and the mining nodes may each cross-check against the other entries in the commitment database server 118 (referring to FIG. 1). In this way, the same data package can be analyzed by two or more, or at least three, mining nodes, with the results of the analysis by each mining node being externally verifiable.

Once the first and second mining nodes have processed the data package and have themselves used the commitment database 512 (referring to FIG. 5) to cross-check that another mining node has successfully validated the same data package, they send the private data output back to the data broker server 114.

Thus in step 812, the data broker server 114 receives, via input/output module 708, a first private data output from the first mining node 116a having analyzed the data package and a second private data output from the second mining node 116b having analyzed the data package. Before assembling the genetic sequence information from all the private data outputs and sending it back to genetic sequencer user node 110 (referring to FIG. 1), the data broker server 114 can directly cross check and validate the private data outputs for the same data package. A substitution cipher may be used by the mining nodes for the genetic sequence information, so two miners would not be able to directly see that they had produced the same sequence, but these could both be decoded by the data broker server 114.

If the data broker server 114 issues cryptotokens to the mining nodes for appending block records to a blockchain, the data broker server 114 may also check that commitment database for an externally verifiable proof of work by, in step 814, accessing the commitment database 512 in the commitment database server 118 and cross checking that the database entries for the first data package identifier and the second data package identifier validate. The data broker server 114 may have other validation requirements before a signed cryptotoken may be issued, such as a minimum number of matching private data outputs.

In this way, a data broker server 114 may provide randomly selected data packages for processing to mining nodes in a mining network, and it may provide signed cryptotokens for adding block records to a blockchain if the metadata commitment value posted to a commitment database cross validates the computational work performed by the mining node, such that the entry in the commitment database provides an externally verifiable proof of work.

In other embodiments, a signed cryptotoken from the data broker server 114 is not needed for the mining nodes to append block records to the blockchain, and the mining nodes may rely on the entries in the commitment database 512 directly.

Once a mining node has checked the commitment database server 118 and is able to use its entry as an externally verifiable proof of work in relation to the data package, and once the other requirements are met, it can append a block record to the blockchain. The method steps for achieving this will now be described in relation to mining node 116a and FIG. 3. The blockchain management module 316 may create a block record for the blockchain using a reference to at least the metadata commitment value stored at the commitment database server 118 as the proof of work.

Thus, creating a block record for the blockchain may include the blockchain management module 316 consulting a version of the blockchain stored in one or more machine readable storage media locally to the mining node 116a to extract the unique identifier of the preceding block of the blockchain, and retrieving payload data from a data pool of unprocessed payload data. The new block may be created including the reference to the preceding block and a reference to the commitment database 512 entry at the commitment database server 118 as the proof of work, and/or any cryptotoken received from the data broker server 114.

The mining node 116a may then communicate, via the input/output module 308, the created block record to at least another mining node (e.g. mining node 116b and mining node 116b) of the mining network. These mining nodes may consult their locally stored versions of the blockchain and check that the newly received block from mining node 116a is valid by checking the proof of work validates (with reference to the commitment database server 118), before appending the block record to their locally stored block chains, before sending the new block record on to other mining nodes in the mining network for them to update their block chains to append the block record.

Appending a block record to the blockchain at another mining node (e.g. the mining node 116b) may include the mining node 116b receiving, from another mining node of the blockchain network (in this case mining node 116a), a block record for addition to the blockchain. The mining node 116b may extract from the received block record a reference to the first metadata commitment value stored at the commitment database server and verify the proof of work for the first mining node using the first metadata commitment value stored at the commitment database server. Based on the verifying, the mining node 116b may update the version of the blockchain stored thereat to include the received block record.

Verifying the proof of work for the first mining node 116a may comprise the second mining node 116b receiving, from the commitment database server, the first metadata commitment value, first validation data, and the subsequently revealed first metadata. The second mining node 116b may then use the cryptographic commitment scheme, such as by hashing the received first metadata and the first mining node identifier to generate a recreated first metadata commitment value. The second mining node 116b may then compare the recreated first metadata commitment value and the received first metadata commitment value, and if the comparing indicates the recreated first metadata commitment value and the received first metadata commitment value match, the second mining node 116b may validate the proof of work for the received block record.

In this way, the proof of work in block records received for appending to the blockchain may be validated at each mining node with reference to the entries in the commitment database, without having to relying on trust in the data broker server to act as an authority server.

The blockchain may be permissionless, which should allow any computing device to operate as a mining node (provided they are able to run the mining software to process the signal information).

In accordance with the present disclosure, the commitment database retaining a tamper-proof and timestamped record of metadata commitment values and validation data allows external verification by mining nodes of the computational work done to generate a private data output, without needing to reveal the private data output, the successfully validated entries including the metadata providing an externally verifiable proof of work for use in appending a block record to a blockchain. By reference to other metadata commitment values in the externally accessible commitment database, mining nodes can check and validate whether other mining nodes in the mining network have analyzed the same data package and produced by their analysis the same metadata. This is achieved by the mining node accessing the metadata commitment values posted by other mining nodes to the commitment database, and attempting to recreate, using the cryptographic commitment scheme, that metadata commitment value using the metadata generated by the mining node in its own analysis, and the validation data posted to the commitment database together with the metadata commitment value. If the recreated metadata commitment value is the same as the metadata commitment value posted to the commitment server by the other mining node, the mining node will be able to demonstrate that it has successfully completed the analysis and that this corroborates against another mining node, with which it cannot have colluded. Provided the minimum validation requirements are met, the mining node can then request the issuance of a cryptotoken, for example from the data broker server, with the metadata commitment value entry posted in the commitment database acting as an externally verifiable proof of work without that private data output needing to be revealed. In particular, if, after the mining node has validated a second metadata commitment value from a second mining node, the mining node posts to the commitment database the metadata it generated, then any node having access to the commitment database can validate the work completed by the mining node using the cryptographic commitment scheme based on the combination of the posted metadata and validation data, and by comparing the recreated metadata commitment value with the posted metadata commitment value. In this way, the commitment database entry by the mining node acts as an externally verifiable proof of work for the analysis of the data package performed at the mining node, without the private data output needing to be revealed. Thus the commitment database can support a proof of work for such a blockchain implementation, without having to rely solely on the authority of the data broker server. Further, by the commitment database, mining nodes can be caused to perform computational work to produce private data outputs, in a way in which collusion between the mining nodes is prevented, while also allowing non-colluding mining nodes to cross check their analysis and post an externally verifiable proof of work.

Further, in accordance with the present disclosure, the method may provide a mechanism for mining nodes to analyze signal information output from a genetic sequencer to generate reads of a polynucleotide sequence, and for the computational work necessary to generate the polynucleotide sequence to be externally verifiable such that a proof of work can be generated and used for appending a block record to a block chain, while being able to keep the polynucleotide sequence private.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. In particular, any dependent claims may be combined with any of the independent claims and any of the other dependent claims.

In the preceding detailed description, many of the processing tasks described have concerned the conversion of signal information representative of a polynucleotide sequence into a base sequence. However, the skilled person would appreciate that the methods and apparatuses described herein are applicable to other types of signal information. For example, signal information may relate to other native molecules such as proteins or secondary modifications. As another example, signal information may relate to modified or synthetic molecules such as oligonucleotide tags, analogs of nucleic acids, or expandomers including expandable nucleoside triphosphate.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method, performed by a data broker server, for use in conjunction with a commitment database server and a plurality of mining nodes for establishing externally verifiable proof of work as immutable evidence of computational work completed by the mining nodes to generate a private data output, the proof of work being for use in appending a block record to a blockchain, the method comprising:

receiving signal information to be kept private;

storing the signal information as one or more data packages in a data package store;

receiving a request for a first data package from a first mining node and a request for a second data package from a second mining node;

randomly selecting a data package awaiting processing from the data package store;

sending the selected data package to the first mining node with a first data package identifier and sending the selected data package to the second first mining node with a second data package identifier different to the first data package identifier;

receiving a first private data output from the first mining node having analyzed the selected data package and receiving a second private data output from the second mining node having analyzed the selected data package; and accessing a commitment database in the commitment database server and cross checking that a database entry for the first data package identifier and the second data package identifier are validated.

2. The method of claim 1, wherein the signal information is representative of a polynucleotide sequence.

3. The method of claim 2, wherein the polynucleotide sequence comprises a deoxyribonucleic acid sequence or a ribonucleic acid sequence.

4. The method of claim 1, wherein the signal information comprises raw data produced by a nanopore sequencer.

5. The method of claim 1, wherein the signal information comprises current information corresponding to current flow through a nanopore and a polynucleotide translocating through the nanopore.

6. The method of claim 1, wherein the blockchain is permissionless allowing any computing device to operate as a mining node.

7. A data broker server, for use in conjunction with a commitment database server and a plurality of mining nodes for establishing externally verifiable proof of work as immutable evidence of computational work completed by the mining nodes to generate a private data output, the proof of work being for use in appending a block record to a blockchain, the data broker server comprising:
- a processor; and
- a memory storing instructions that, when executed by the processor, configure the data broker server to:
    - receive signal information to be kept private;
    - store the signal information as one or more data packages in a data package store;
    - receive a request for a first data package from a first mining node and a request for a second data package from a second mining node;
    - randomly select a data package awaiting processing from the data package store;
    - send the selected data package to the first mining node with a first data package identifier and send the selected data package to the second first mining node with a second data package identifier different to the first data package identifier;
    - receive a first private data output from the first mining node having analyzed the selected data package and receive a second private data output from the second mining node having analyzed the selected data package; and
    - access a commitment database in the commitment database server and cross check that a database entry for the first data package identifier and the second data package identifier are validated.

8. The data broker server of claim 7, wherein the signal information is representative of a polynucleotide sequence.

9. The data broker server of claim 8, wherein the polynucleotide sequence comprises a deoxyribonucleic acid sequence or a ribonucleic acid sequence.

10. The data broker server of claim 7, wherein the signal information comprises raw data produced by a nanopore sequencer.

11. The data broker server of claim 7, wherein the signal information comprises current information corresponding to current flow through a nanopore and a polynucleotide translocating through the nanopore.

12. The data broker server of claim 7, wherein the blockchain is permissionless allowing any computing device to operate as a mining node.

13. A non-transitory computer-readable storage medium including instructions that, when executed by a computer, cause the computer to:
- receive signal information to be kept private;
- store the signal information as one or more data packages in a data package store;
- receive a request for a first data package from a first mining node and a request for a second data package from a second mining node;
- randomly select a data package awaiting processing from the data package store;
- send the selected data package to the first mining node with a first data package identifier and send the selected data package to the second first mining node with a second data package identifier different to the first data package identifier;
- receive a first private data output from the first mining node having analyzed the selected data package and receive a second private data output from the second mining node having analyzed the selected data package; and
- access a commitment database in the commitment database server and cross check that a database entry for the first data package identifier and the second data package identifier are validated.

14. The non-transitory computer-readable storage medium of claim 13, wherein the signal information is representative of a polynucleotide sequence.

15. The non-transitory computer-readable storage medium of claim 14, wherein the polynucleotide sequence comprises a deoxyribonucleic acid sequence or a ribonucleic acid sequence.

16. The non-transitory computer-readable storage medium of claim 13, wherein the signal information comprises raw data produced by a nanopore sequencer.

17. The non-transitory computer-readable storage medium of claim 13, wherein the signal information comprises current information corresponding to current flow through a nanopore and a polynucleotide translocating through the nanopore.

18. The non-transitory computer-readable storage medium of claim 13, wherein the blockchain is permissionless allowing any computing device to operate as a mining node.

* * * * *

SEQUENCE LISTING

```
Sequence total quantity: 1
SEQ ID NO: 1            moltype = DNA  length = 1034
FEATURE                 Location/Qualifiers
source                  1..1034
                        mol_type = other DNA
                        organism = unidentified
misc_feature            1..1034
                        note = sampleid=Strawb_leaf
SEQUENCE: 1
atcattactt cgttcgaacc gtattgctct tgattttcct actttgttta ctagttttag   60
acttgatttt atattgtgta gttgctttaa cttagtttta tttcattata aactggtttt  120
ataacatttg ataatagatt acgctttgag gtttttatgg ctagaggcgt gccttaagca  180
ctctcaggcg gcgcctgggc tcagggtcgc cctggcctag gtgcgcctag ggccttttaa  240
tcataatgag tattttaacg ccgaatagaa taagattatt ctttcaaggc aattcctgca  300
cttctttttt tcttgccatc tgtatcattg gtttatgaga ttctgccttc tcatagctaa  360
cattatcatc tatcgctata cgttgtactg atttacttcc ttatttgtga tacattttgc  420
gcttagttgt gcctctttgt tgttcagtca cattttcacc atatgtaagc gaatactgca  480
tactttggaa actggcatgc tctctattgc tgcttcatat cttgaaatga actctgtttc  540
tctttgtcaa aagaactaac cttgagataa acagttcttt gttttctatc tttaggagtg  600
ccacttgtcg tggccaattt atttggtgtt atcttgagga taagtgtatg ccaaatgaga  660
ctaagattct tctgtgccTt agtttttattc tcatagctcc tgataaacca tttcttaggt  720
taatttgcaa tttaaatgtg gagcgtctca ggtgaatatc ttgacacaca ctgcaagtca  780
aacttaaaac tgaacagctg aaagaaatgc ctaagttgaa gcaacagcac attacataaa  840
gatcaagttg aattgtatga gtcgtggtat gggccgtgaa tgggtgatac ttgccttgct  900
gctcgcagtg cttctgagcg cggttaccta cagcagatgt tatagttgat gtcaagctgc  960
acatgttaag ctaagtcaat gatggatctg gaacactatg tcctggaact ggtcaaaaac 1020
ttcggtctcc acat                                                  1034
```